United States Patent [19]

Pine

[11] 3,915,059

[45] Oct. 28, 1975

[54] SPLINE CUTTING MECHANISM

[76] Inventor: MacDonald Pine, 121 Greencastle Circle, Springfield, Ill. 62703

[22] Filed: Aug. 29, 1972

[21] Appl. No.: 284,762

[52] U.S. Cl. .............................. 90/5; 90/9; 90/28.1; 90/DIG. 8
[51] Int. Cl.² .......................... B23F 5/16; B23F 5/20
[58] Field of Search ............... 90/28.1, 9, 14, 4, 1.6, 90/5, 92, DIG. 8, 29, 31; 29/95, 103 C, 29/159.2, 90

[56] References Cited
UNITED STATES PATENTS

| 1,510,889 | 10/1924 | Hooker | 29/159.2 |
| 2,180,823 | 11/1933 | Harrison | 29/90 |
| 2,931,274 | 4/1960 | Williams | 90/1.6 |

FOREIGN PATENTS OR APPLICATIONS

| 1,046,445 | 12/1953 | Germany | 90/4 |
| 46-17480 | 5/1971 | Japan | 90/9 |
| 17,224 | 8/1910 | United Kingdom | 90/14 |

Primary Examiner—Harrison L. Hinson
Assistant Examiner—Z. R. Bilinsky

[57] ABSTRACT

A spline cutting mechanism according to the present invention comprises a generally frusto-conical cutter having a cutting edge and a trailing edge. A plurality of teeth are defined in the periphery of the cutter at the cutting edge, each having a clearance at the cutting edge and behind the cutting edge. The cutter is supported by a cutter shaft that is freely supported for sympathetic rotation in a cutter housing by a plurality of bearings. The cutter housing is adapted for mounting on a conventional compound slide of a lathe in such manner as to dispose the axis of the cutter in angular relation with work that is rotatably supported by a lathe chuck. The freely rotatable cutter is advanced into the rotating work by the lead screw of the lathe to cut either external or internal longitudinal splines into the work.

3 Claims, 4 Drawing Figures

SPLINE CUTTING MECHANISM

BACKGROUND OF THE INVENTION

This invention relates generally to the cutting of longitudinal splines both internally and externally of work and more particularly relates to the cutting of such splines by utilizing a conventional lathe to rotate work on or within which the splines are to be formed and by feeding into the rotating work a sympathetically freely rotating cutter mounted on the compound slide of the lathe in such manner as to simultaneously form a plurality of longitudinal splines in the rotating work.

Both internal and external splines are conventionally cut one spline tooth at a time by milling or hobbing machines. Each of these methods of forming splined connections logically takes a considerable amount of machine time because each tooth must be cut individually and the teeth must be accurately spaced about the internal or external periphery of the work on which the splines are formed.

It has long been desirable to form splined connections by simultaneous cutting of the teeth of the spline but heretofore such has not generally been practical.

It is therefore a primary object mechanism the present invention to provide a novel spline cutting mechansim that is capable of simultaneously cutting all of the teeth of both internal and external splines with a single pass of the spline cutting mechanism.

It is also an object of the present invention to provide a novel spline cutting mechanism employing a conventional lathe for the cutting of such splines.

It is an even further object of the present invention to provide a novel spline cutting mechanism that utilizes spline cutters that are simple in design and inexpensive in manufacture.

Among the several objects of the present invention is noted the contemplation of a novel spline cutting mechanism that is capable of simultaneously cutting all of the teeth of both internal and external splines.

An even further object of the present invention contemplates the provision of a novel spline cutting mechanism utilizing rotating work having a minor diameter hole drilled therein and by feeding into the minor diameter hole a sympathetically rotatable cutter head that is supported for free rotation and is oriented in angular relation with the axis of the spline to be cut.

Another object of the present invention is to provide novel spline cutting mechanism that is simple in nature, reliable in use, and low in cost.

SUMMARY OF THE INVENTION

The invention relates to the use of a conventional lathe having a rotatable head chuck that is adapted to support the work within which or on which splines are to be cut. To the compound slide of the lathe is fixed a cutter housing having a plurality of bearing disposed therein mounting a cutter shaft for free rotation within the cutter housing. At one extremity of the cutter shaft may be fixed a cutter head that is generally of frustoconical configuration with the base or large diameter portion thereof facing generally toward the work. The cutter teeth of the cutter head are ground to an angle of approximately 5° with respect to a plane substantially normal of the cutter axis and the cutter teeth are tapered from the large diameter thereof toward the smaller diameter of approximately 2° to provide clearance as the cutter is introduced into the work. For purpose of cutting internal splines the work is provided with a minor diameter bore drilled axially of the work. The cutter shaft and cutter are angularly related to the axis of the minor diameter hole at approximately 2° thereby causing only one tooth of the cutter head to be in cutting relation with the work at any one time.

In order to form the internal spline the feed apparatus of the lathe is typically set at 0.001 inches per revolution and is engaged with the lead screw while the lathe chuck turns at a speed of 400 to 800 r.p.m. As the freely rotatable cutter head engages the work it begins to rotate sympathetically with the work and as it rotates each of the teeth of the cutter head take a small cut axially of the minor diameter hole upon each revolution of the work. Feeding of the cutter head completely into the minor diameter hole will result in the formation of a plurality of elongated spline teeth defining a completed internal spline.

External splines are formed by orienting the axis of the cutter head at substantially 2° with respect to a line parallel to the axis of the work. The compound slide of the lathe is adjusted to orient one of the teeth of the lathe at substantially the full depth of the spline teeth to be cut. The lead screw of the lathe is engaged to bring the freely rotatable cutter head into engagement with the rotating work thereby causing the cutter head to rotate sympathetically with the work and cut all of the external teeth of the spline simultaneously as the cutter head is fed along the exterior of the work. For cutting of external splines it is necessary that the cutter be provided with an accurate number of teeth to correspond with the circumferential surface within which the external spline is to be cut.

BRIEF DESCRIPTION OF THE DRAWINGS

So that the manner in which the above recited advantages and objects of the present invention as well as others which will become apparent are attained and can be understood in detail more particular description of the invention briefly summarized above may be had by reference to the preferred embodiment thereof which is illustrated in the appended drawings, which drawings form a part of this specification. It is to be noted, however, that the appended drawings illustrate only a typical embodiment of the invention and is therefore not to be considered limiting of its scope for the invention may admit to other equally effective embodiments.

In the drawings.

DESCRIPTION OF PREFERRED EMBODIMENT

Figure 1:
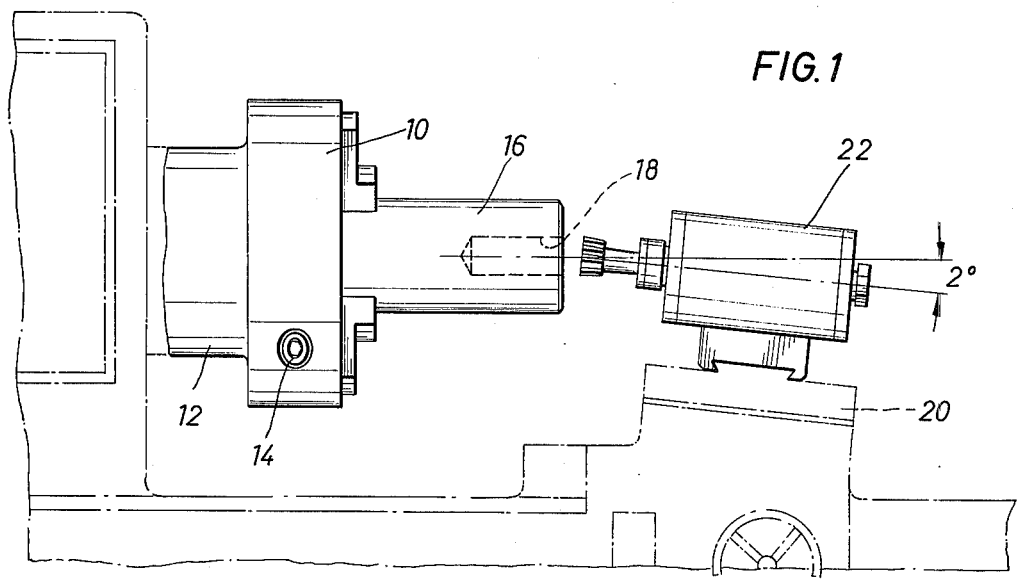
FIG. 1 is a plan view illustrating the rotatable lathe chuck and compound slide of a conventional lathe to which is fixed spline cutting apparatus constructed in accordance with the present invention.

Referring now to FIG. 1, there is illustrated the chuck 10 of a lathe 12 having adjustment elements 14 that may be adjusted to positively align a work piece 16 in co-axial relation to the axis of the rotatable chuck 10. The work 16 to be provided with an internal spline is provided with a minor diameter bore 18 that may be drilled of the work 16 in any suitable manner. The cylindrical wall of bore 18 defines the minor diameter of the internal spline being cut.

Also illustrated in FIG. 1 is the compound slide 20 of the lathe 12 which is connectable in conventional manner to the lead screw of the lathe in order to impart linear movement of the compound slide and cutter mechanism parallel to the axis of the work.

A cutter housing 22 may be secured to the compound slide 20 such as by a mating dovetail connection causing the cutter housing and cutter mechanism to be moved with the compound slide.

Figure 2:
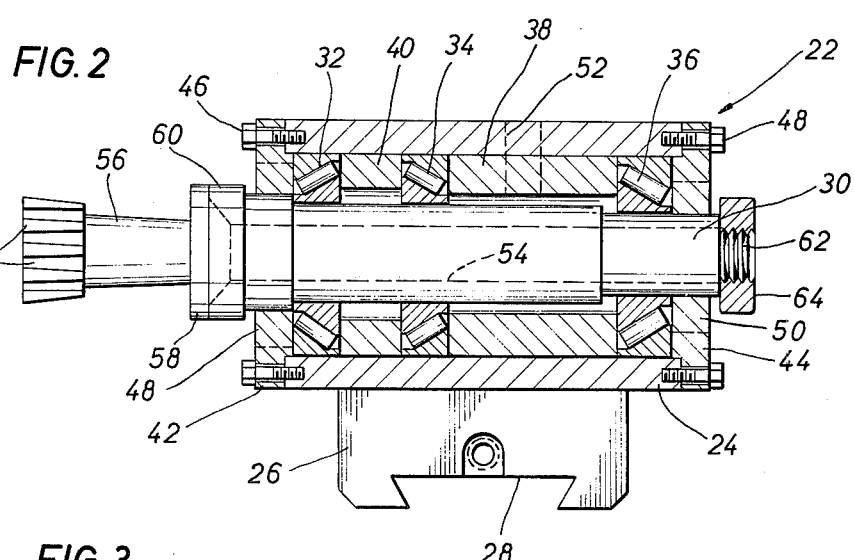
FIG. 2 is a sectional view of spline cutting apparatus constructed in accordance with the present invention.

Referring now to FIG. 2, the cutter housing illustrated generally at 22 includes a housing wall 24 to which is fixed a dove-tail connector block 26 having a dove-tail groove 28 that may be received by a complementary dovetail connection such as is typically found on conventional lathe compound slides. A freely rotatable cutter shaft 30 is supported for free rotation within the cutter housing by thrust bearings 32, 34, and 36 which are maintained in spaced relation within the housing by spacer members 38 and 40. End plates 42 and 44 may be secured to the wall 24 of the housing by a plurality of bolts 46 or by any other appropriate means of connection. The end walls 42 and 44 appropriately serve to retain the bearings and bearing spacers within the housing structure. Annular seals 48 and 50 may be disposed in fixed relation with the end walls 42 and 44 respectively and may establish dynamic sealed relation with the cutter shaft 30. If desired, a lubricant passage 52 may be formed through the housing wall 24 and spacer member 38 and may be appropriately threaded to receive a lubricant fitting through which lubricant material is introduced into the housing in order to simultaneously lubricate the thrust bearings 32, 34, and 36.

The cutter shaft 30 may be centrally bored as indicated in broken line at 54 to receive a cutter arbor 56. The cutter arbor may be provided with an annular flange 58 adapted to engage a head portion 60 of the cutter shaft upon being properly assembled therein. The cutter arbor 56 is provided with an externally threaded extremity 62 adapted to receive a nut 64 to positively secure the arbor in assembly with the cutter shaft.

Figure 3:
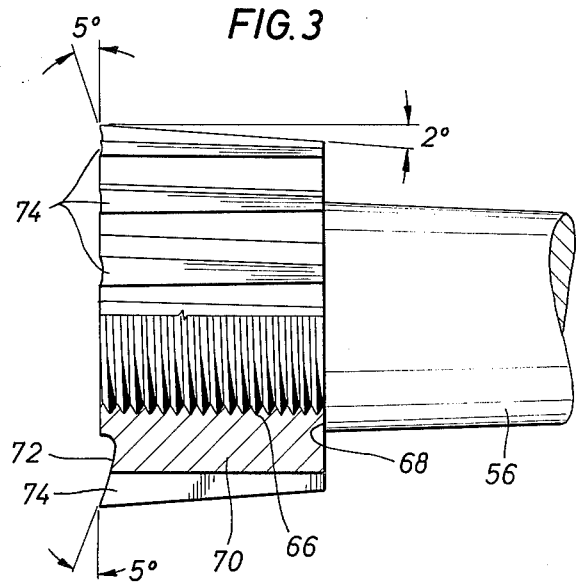
FIG. 3 is a quarter sectional view of a cutter head illustrating the construction thereof in detail.
Figure 4:
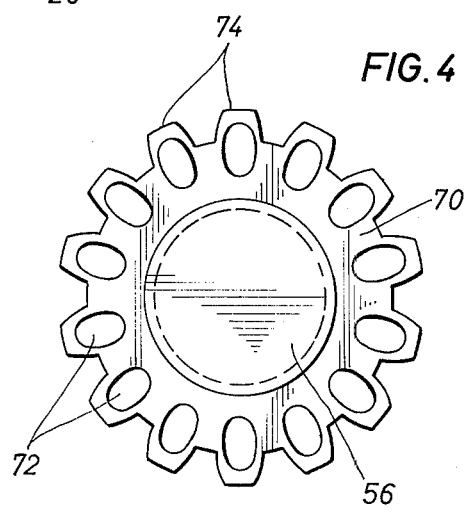
FIG. 4 is an end view of the cutter head structure of FIG. 3.

Referring now to FIGS. 3 and 4, the cutter arbor 56 may be provided with a reduced diameter externally threaded portion 66 defining an annular shoulder 68. A cutter element 70 may be provided with internal threads adapted to receive the externally threaded portion 66 of the cutter arbor. The cutter element 70 when fully received by the externally threaded portion of the cutter arbor will be disposed in abutment with the annular shoulder 68. It may be appropriate for the mating threaded connection between the cutter and the cutter arbor to correspond with rotation of the work in such manner that the threaded connection will not inadvertently become disengaged. It is to be borne in mind however that the cutter element 70 is particularly designed to rotate sympathetically with the work and therefore should not be subject to forces that might otherwise tend to disengage the threaded connection between the cutter and cutter arbor.

Although it is not intended to limit the scope of the present invention to the particular cutter structure illustrated a preferred embodiment of the cutter structure will be described in detail to facilitate understanding. The cutter is of generally frusto-conical configuration having the large diameter thereof facing the work. It has been found that a frusto-conical taper of the cutter from the large diameter to the small diameter thereof will function quite satisfactorily at a taper of 2° from the horizontal. The cutting edge of the cutter may be ground to a clearance of 5° with respect to a plane defined substantially normal to the axis of the cutter. The ground portion 72 of the cutter provides clearance to allow the cutter to cut as it is fed into the work.

The cutter is provided with a plurality of elongated teeth 74 having a cross sectional configuration determined by the configuration of the spline to be cut.

In order to cut an internal spline the axis of the cutter and cutter shaft may be disposed at substantially 2° angular relationship with the axis of the minor diameter bore formed within the work. Since the taper of the cutter is also substantially 2° the outer surface of one tooth of the cutter at any one time will be disposed substantially parallel with the axis of the work with the minor diameter of the cutter teeth disposed substantially coincident with the minor diameter 18 within the rotating work 16.

The chuck 10 of the lathe 12 may be set to rotate the work 16 at 400 to 800 r.p.m. while the compound slide 20 of the lathe may be appropriately set to feed toward the work at substantially 0.001 inches per revolution. Due to the angular relationship between the cutter and the work it is obvious that initial engagement with the work will be established by a single cutter tooth that is substantially aligned with the coincident portion of the minor diameter surface opposing this particular tooth. As the cutter and work become engaged by feeding the compound slide and likewise the cutter housing toward the work the cutter will be rotated sympathetically with the work causing each of the cutter teeth to engage the work and take a small cut at one portion of the rotative travel of the tooth as it revolves. It has been found that small chips will form ahead of the cutter and will curl and be forced inwardly into the drilled bore of the work. This has not been found however to in any way interfere with proper functioning of the cutter as it generates all of the spline teeth of the spline in a single operation.

As a consequence of the angular orientation of the cutter element to the axis of the workpiece, each of the teeth of the cutter will alternatively move into and out of cutting engagement with the workpiece during each rotative cycle. A tooth positioned at top dead center will not be in engagement with the workpiece. As the cutter is rotated by the workpiece, because of the engagement that occurs between the workpiece and the teeth at the bottom of the cutter, after a few degrees of rotation the tooth will have left its top dead center position and will begin to approach the workpiece. After a few more degrees of rotation, the tooth will, responsive to its rotary movement, move into engagement with the rotating workpiece. Continued rotation of the cutter will cause the rotating tooth to continue cutting deeper into the workpiece until the tooth has reached the bottom dead center position of its sympathetic rotation with the workpiece. Further rotation of the cutter with the workpiece will cause the rotating cutter tooth to begin moving away from cutting engagement and will cause the chip, generated during the cutting movement, to be dislodged, whereupon the chip will be displaced forwardly of the cutter and will fall clear of subsequent cutting operations. The metal chips produced during the spline cutting operation will not interfere in any manner whatever with the cutting operations being conducted. It should be borne in mind that the teeth of the cutter accomplish the cutting operation during rotation thereof from the top dead center position of rotation to substantially the bottom dead center position responsive solely to rotation of the workpiece and sympathetic rotation of the cutter. This manner of cutting allows the teeth to cool during a large segment of the rotary travel thereof and also allows chip removal to occur during this portion of the rotary movement.

It should also be borne in mind that the cutter is subjected to linear travel during each rotative cycle due to feeding of the compound slide toward the workpiece. This feature actually causes the cutter teeth to accomplish cutting function slightly beyond the bottom dead center positions thereof during each rotational cycle because of the compound rotary and linear movement that occurs during spline cutting operations.

For the purpose of cutting an external spline it is necessary that the cutter be particularly designed with an appropriate number of properly spaced teeth that correspond with the external diameter of the work on which the spline is to be cut. After selecting the proper cutter to cut a spline in the exterior of cylindrical work it is simply necessary to orient the compound slide of the lathe in such manner that the axis of the cutter is angularly oriented substantially 2° with respect to the cylindrical surface on which the spline is to be formed. Of course, the axis of the cutter is also disposed in substantially 2° angular relationship with the axis of the work. The cutter is fed into the work by the compound slide in such manner that one tooth of the cutter is brought into engagement with the peripheral portion of the work with the exterior of the tooth substantially aligned with the minor diameter of the spline to be cut. The cutter will be fed into the work by the compound slide at substantially 0.001 inches per revolution with the work rotating at 400 to 600 r.p.m. The cutter will be caused to rotate sympathetically with the work as the work is rotated thereby causing a plurality of splines to be formed simultaneously with a single pass or single operation of the lathe mechanism.

It is obvious therefore that I have provided a novel spline cutting mechanism that is capable of simultaneously cutting all of the teeth of both internal and external splines in a single pass. The spline cutting mechanism of my invention employes conventional lathe devices in order to cut both internal and external splines thereby freeing milling and hobbing machines for other tasks to which they may be suited and thereby reducing the costs of cutting such splines to a substantial degree. Both internal and external splines are cut with cutter devices that are simple and inexpensive and which may be employed to cut a large number of splines before needing to be sharpened or discarded. It is obvious therefore that this invention effectively achieves all of the various objects noted hereinabove together with other advantages which are obvious from a description of the apparatus itself.

I claim:

1. An internal spline cutting mechanism for a metal working lathe having a compound slide, said spline cutting mechanism comprising:

an axially extending conically configured rotary cutter having front and rear portions transverse to said axis defining respectively, a leading cutting face and a trailing face, said cutter decreasing in cross section along said axis from said leading face to said trailing face;

a plurality of elongated teeth formed about the periphery of said cutter, said teeth extending from said leading face to said trailing face and diminishing in both height and width therealong the forward portion of each of said teeth lying in said leading face and being undercut and defining a forward clearance, said forward clearance being defined by surface means disposed in angular relation with a plane extending in normal relation to the axis of rotation of said rotary cutter; said forward portion of each of said teeth and said each surface forming an acute angle, a cutter shaft supporting said cutter for rotation;

a bearing assembly receiving said cutter shaft and supporting said cutter shaft for free rotation relative to said bearing assembly, said bearing assembly being received by the compound slide of a lathe, a rotatable chuck on said lathe for holding work on which splines are to be cut;

a chuck drive mechanism for rotating said work;

said compound slide of said lathe orienting the axis of rotation of said cutter in inclined relation to the axis of said work so that each of said elongated teeth of the cutter are sequentially aligned parallel to said work axis and advancing said cutter into said work.

2. A spline cutter mechanism as recited in claim 1, wherein said bearing assembly for rotatably supporting said cutter comprises:

a support housing being received in fixed relation to said compound slide of said lathe;

bearing means being disposed within said support housing; and said cutter shaft is rotatably supported by said bearing means.

3. A spline cutting mechanism as recited in claim 2:

said work having a minor diameter bore formed axially thereof and defining the minor diameter of the spline to be cut; and said cutter being advanced axially into said bore while being retained in said inclined position as said work is being rotated by said lathe chuck.

* * * * *